(12) United States Patent
Lalgudi et al.

(10) Patent No.: US 8,362,195 B2
(45) Date of Patent: Jan. 29, 2013

(54) IONICALLY CONDUCTIVE POLYMER FOR USE IN ELECTROCHEMICAL DEVICES

(76) Inventors: Ramanathan S. Lalgudi, Westerville, OH (US); Jeffrey Boyce, Grove City, OH (US); Jay Sayre, Gahanna, OH (US); Bhima R. Vijayendran, Dublin, OH (US)

(*) Notice: Subject to any disclaimer, the term of this patent is extended or adjusted under 35 U.S.C. 154(b) by 1464 days.

(21) Appl. No.: 11/977,804

(22) Filed: Oct. 26, 2007

(65) Prior Publication Data

US 2009/0111027 A1    Apr. 30, 2009

(51) Int. Cl.
| | |
|---|---|
| C08G 75/18 | (2006.01) |
| C08G 75/20 | (2006.01) |
| C08G 75/24 | (2006.01) |
| C08G 65/40 | (2006.01) |
| H01M 4/86 | (2006.01) |
| H01M 8/10 | (2006.01) |
| H01B 1/12 | (2006.01) |

(52) U.S. Cl. ..... 528/391; 528/489; 528/491; 528/502 R; 528/503; 521/25; 521/27; 429/12

(58) Field of Classification Search ............ 528/391, 528/489, 491, 502 R, 503; 521/25, 27; 429/12
See application file for complete search history.

(56) References Cited

U.S. PATENT DOCUMENTS

| | | | | |
|---|---|---|---|---|
| 7,897,650 | B2 * | 3/2011 | Sayre et al. | 521/25 |
| 8,222,367 | B2 * | 7/2012 | Lalgudi et al. | 528/125 |

* cited by examiner

*Primary Examiner* — Duc Truong
(74) *Attorney, Agent, or Firm* — MacMillan, Sobanski & Todd, LLC

(57) ABSTRACT

An ionically conductive polymer has the chemical structure 1 as shown herein. Examples of the polymer include 4,4'-(4-(1H-benzo[d]imidazol-2-yl)butane-2,2-diyl)diphenol, sulfonated poly(aryl ether sulfone) containing benzimidazole backbone, sulfonated poly(aryl ether sulfone) containing carboxylic acid backbone, and sulfonated poly(aryl ether sulfone) containing benzimidazole backbone from carboxylic acid containing sulfonated poly(aryl ether sulfone). The polymer has intrinsic ion conducting properties so that it is effectively conductive even under low water conditions. In one embodiment, the polymer has an ionic conductivity of at least $1\times10^{-5}$ S/cm at a temperature of 120° C. when the polymer is substantially anhydrous.

33 Claims, No Drawings

IONICALLY CONDUCTIVE POLYMER FOR USE IN ELECTROCHEMICAL DEVICES

BACKGROUND OF THE INVENTION

This invention relates in general to polymers, and in particular to an ionically conductive polymer for use in fuel cells and other electrochemical devices. For example, the polymer may be used for producing fuel cell membranes and/or as a binder in fuel cell electrodes.

A fuel cell is an electrochemical device that continuously converts chemical energy into electric energy and some heat for as long as fuel and oxidant are supplied. Fuel cells are evolving. Some currently known categories of fuel cells include polymer electrolyte membrane (PEM), alkaline, phosphoric acid, molten carbonate, solid oxide, and microbial/enzyme based.

At the heart of the PEM fuel cell is a membrane electrode assembly (MEA). The MEA includes a membrane made from a polymer electrolyte or proton conducting polymer. The polymer electrolyte membrane is sandwiched between a pair of electrodes called an anode and a cathode. The MEA also usually includes porous, electrically conductive sheets called gas diffusion layers positioned adjacent to the electrodes to permit diffusion of reactants to the electrodes.

In operation, a fuel such as hydrogen or methanol is flowed into contact with the anode where it dissociates into electrons and protons. The electrons, which cannot pass through the polymer electrolyte membrane, flow from the anode to the cathode through an external circuit containing an electric load, which consumes the power generated by the fuel cell. The protons pass through the polymer electrolyte membrane and combine with oxygen and electrons on the cathode to produce water and heat.

Typically polymer electrolytes require a sufficient level of hydration in order to effectively conduct protons through the membrane. However, fuel cells are sometimes operated under conditions in which the polymer electrolyte membrane has a low water content, for example, under conditions of low relative humidity (RH) and/or high temperature. Various approaches have been used to increase the proton conductivity of polymer electrolyte membranes under these conditions but none have been totally successful.

SUMMARY OF THE INVENTION

The invention relates to an ionically conductive polymer for use in fuel cells and other electrochemical devices. The polymer comprises the following chemical structure 1:

STRUCTURE 1

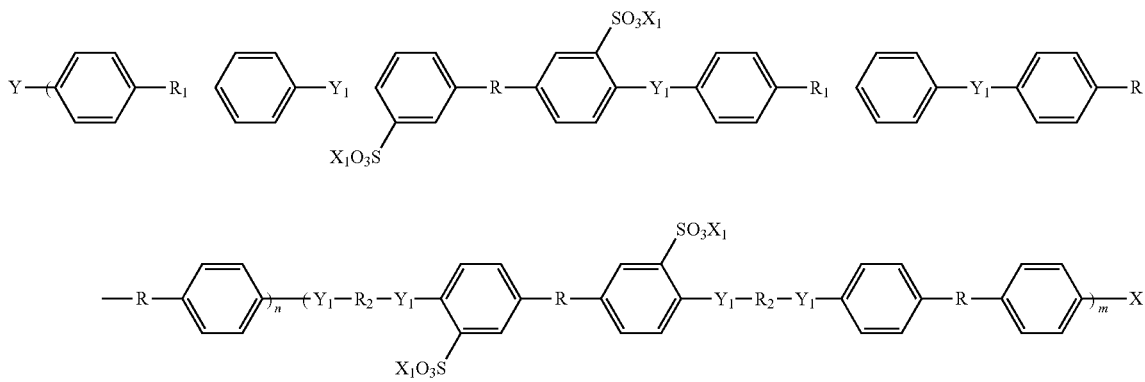

Where X = F, Cl, Br, I  Y = OH, SH
$X_1$ = Na, K, Cs, Rb  $Y_1$ = O, S
$n/(n + m) = 0.1$-$0.9$

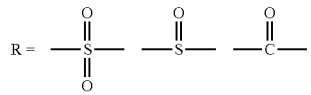

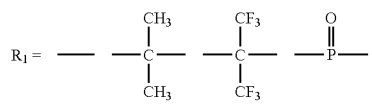

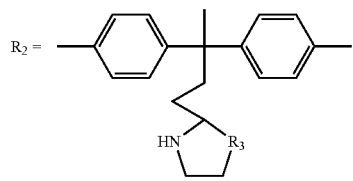

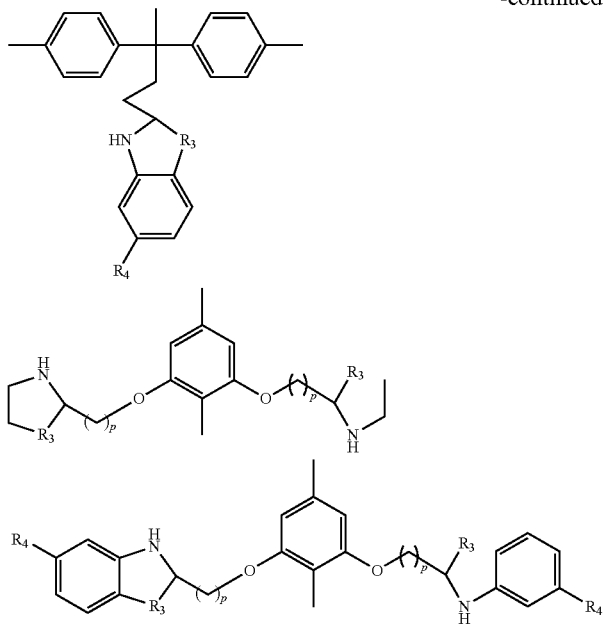

$R_3$ = N, O, S
$R_4$ = H, $CF_3$, CN
p = 1-12

The polymer has intrinsic proton conducting properties that are not dependent on the water content, so that it is effectively conductive under substantially all water conditions including low water content conditions.

The invention also relates to processes of producing the polymer, including processes using particular reactants, solvents and/or catalysts.

DETAILED DESCRIPTION OF THE PREFERRED EMBODIMENTS

An ionically conductive polymer is provided for use in fuel cells and other electrochemical devices. The polymer comprises the following chemical structure 1:

STRUCTURE 1

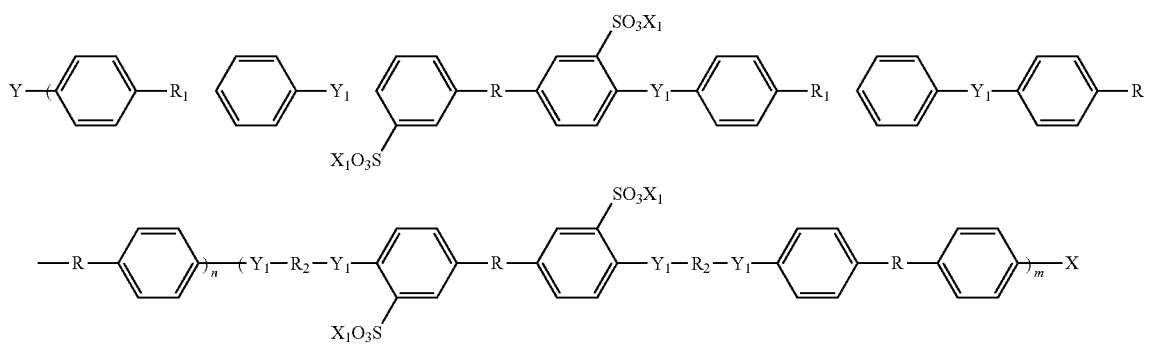

Where X = F, Cl, Br, I  Y = OH, SH
$X_1$ = Na, K, Cs, Rb  $Y_1$ = O, S
n/(n + m) = 0.1-0.9

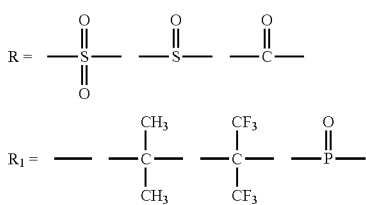

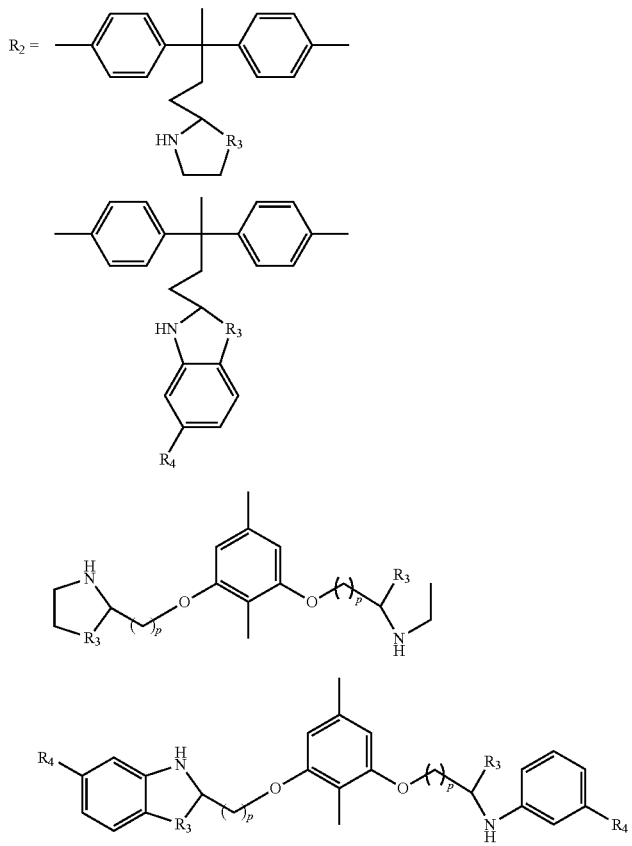

$R_3$ = N, O, S
$R_4$ = H, $CF_3$, CN
p = 1-12

As shown above, the $R_2$ structure includes a benzimidazole when $R_3$=N, a benzoxazole when $R_3$=O, and a benzothiazole when $R_3$=S. The $R_2$ structure included as part of the polymer backbone allows proton conductivity by a mechanism that is not dependent on water. In particular, the proton conducting mechanism is through transfer from acidic groups to basic groups on the $R_2$ structure. As a result, the polymer is effectively conductive under substantially all water conditions including low water conditions.

The $R_2$ structure is a flexible moiety on the backbone. This provides segmental mobility for substantially unhindered proton transfer.

The polymer shown in structure 1 includes a sulfonated poly(aryl ether sulfone) as part of the backbone. However, the polymer backbone is not limited to a sulfonated poly(aryl ether sulfone), but rather it can include substantially any type of polymer suitable for producing an ionically conductive polymer as long as it also includes the $R_2$ structure described above.

The typical operating conditions of some embodiments of a fuel cell including the polymer as a component may include a temperature within a range of from about 60° C. to about 150° C. and a relative humidity within a range of from about 25% to about 75%. A fuel cell will sometimes be operated under conditions of low relative humidity, for example an RH less than 50%, and/or high temperature, for example a temperature above 150° C. up to about 200° C. Such low RH and/or high temperature conditions may result in a fuel cell component made from the polymer having a low water content. In one embodiment, a polymer electrolyte membrane made from the polymer has an ionic conductivity of at least about $1\times10^{-5}$ S/cm, and more particularly at least about $1\times10^{-4}$ S/cm, at a temperature of 120° C. when the membrane has a low water content.

The polymer can be produced using any suitable components in any suitable amounts. In one embodiment, the polymer is derived from compound 1 comprising the following chemical structure, where the amount of compound 1 is within a range of from about 10 to about 90 mole percent:

COMPOUND 1

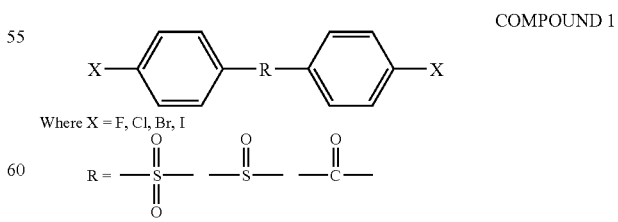

In another embodiment, the polymer is derived from compound 2 comprising the following chemical structure, where the amount of compound 2 is within a range of from about 10 to about 90 mole percent:

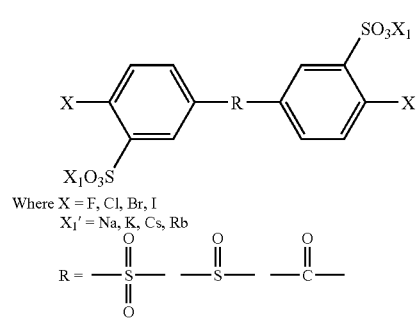

COMPOUND 2

Where X = F, Cl, Br, I
X₁' = Na, K, Cs, Rb

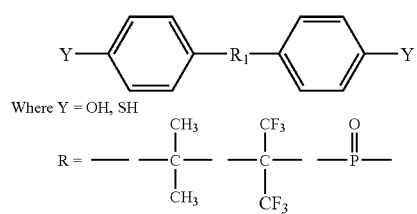

In another embodiment, the polymer is derived from compound 3 comprising the following chemical structure, where the amount of compound 3 is within a range of from about 10 to about 90 mole percent:

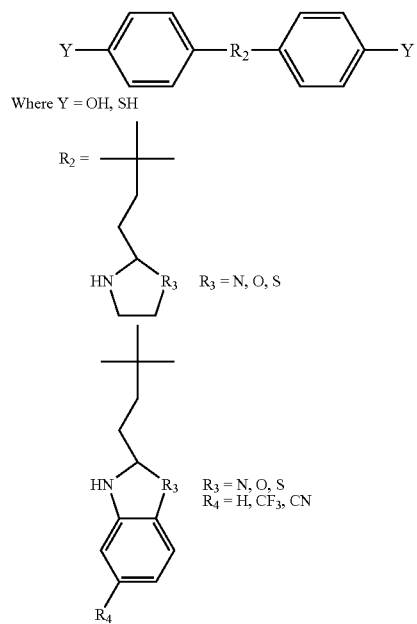

COMPOUND 3

Where Y = OH, SH

In another embodiment, the polymer is derived from compound 4 comprising the following chemical structure, where the amount of compound 4 is within a range of from about 10 to about 90 mole percent:

COMPOUND 4

Where Y = OH, SH

R₃ = N, O, S

R₃ = N, O, S
R₄ = H, CF₃, CN

In one embodiment, the polymer is derived from any combination of compounds 1-4 in any suitable amounts. For example, in a particular embodiment the polymer is derived using all these compounds.

The polymer can be produced by any suitable method. In one embodiment, the polymer is produced by mixing the reactants in a solvent or a solvent mixture and heating the reactant mixture. For example, in a particular embodiment the solvent mixture comprises polar aprotic solvent and nonpolar solvent. Any suitable polar aprotic solvent or mixtures thereof can be used. For example, the polar aprotic solvent may be selected from N,N' dimethyl acetamide, N,N'-dimethyl formamide, N-methyl-2-pyrrolidone, sulfolane or a mixture of these solvents.

Any suitable nonpolar solvent or mixtures thereof can be used. For example, the nonpolar solvent may be selected from benzene, toluene, o-xylene, m-xylene, p-xylene or a mixture of these solvents.

The polar aprotic solvent and the nonpolar solvent can be used in any suitable amounts. For example, in one embodiment the solvent mixture comprises the polar aprotic solvent and the nonpolar solvent in a weight ratio within a range of from about 1:9 to about 9:1, more particularly within a range of from about 6:4 to about 8:2.

In one embodiment, the polymer is produced in a reaction that uses a catalyst. Any suitable catalyst or a mixture of different catalysts can be used in the reaction. For example, the catalyst may be selected from alkali metals and their carbonates, alkali earth metals and their hydroxides, alkali metal salts of transition metal phosphates or a mixture of these catalysts.

The catalyst can be used in any suitable amount. For example, in a particular embodiment the polymer is derived from compound 1, compound 2, compound 3 and compound 4, and the amount of catalyst is within a range of from about 1 to about 30 mole percent excess to the combined mole ratio of compound 3 and compound 4.

In a particular embodiment, the polymer is derived from compound 4 as shown above, and compound 4 is produced by reacting compound 5 with compound 6 comprising the following chemical structures:

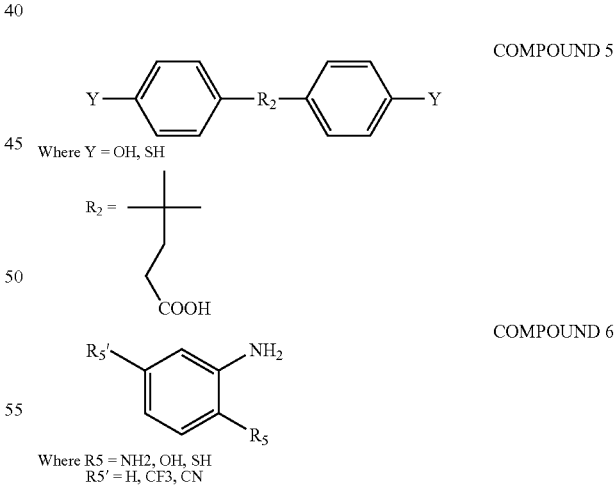

COMPOUND 5

Where Y = OH, SH

COMPOUND 6

Where R5 = NH2, OH, SH
R5' = H, CF₃, CN

The reaction of compound 5 with compound 6 to produce compound 4 can be conducted in any suitable manner. In a particular embodiment, compound 5 and the compound 6 are reacted in a solvent mixture comprising a polar aprotic solvent, a nonpolar solvent, and a polar solvent. The different solvents can be used in any suitable amounts. For example, in a particular embodiment the weight ratio of polar aprotic solvent to nonpolar solvent to polar solvent is within a range of from about 1:7:2 to about 6:2.5:0.5, and more particularly within a range of from about 6:3:1 to about 7:2.5:0.5.

Any suitable polar aprotic solvent, nonpolar solvent and polar solvent can be used in the reaction. For example, in a particular embodiment the polar aprotic solvent is selected from N,N' dimethyl acetamide, N,N'-dimethyl formamide, N-methyl-2-pyrrolidone, sulfolane and mixtures thereof; the nonpolar solvent is selected from benzene, toluene, o-xylene, m-xylene, p-xylene and mixtures thereof; and the polar solvent is selected from n-butanol, isopropanol, cyclohexanol and mixtures thereof.

In one embodiment, the reaction of compound 5 with compound 6 to produce compound 4 uses a catalyst. Any suitable catalyst or a mixture of different catalysts can be used in the reaction. For example, in a particular embodiment the reaction uses a catalyst selected from sulfuric acid, phosphoric acid, polyphosphoric acid, p-toluene sulfonic acid, alkali metals and their carbonates, alkali earth metals and their hydroxides, alkali metal salts of transition metal phosphates and mixtures thereof, and the amount of catalyst is within a range of from about 1 to about 30 mole percent.

In a particular embodiment, the polymer is produced by the steps of: (a) mixing compound 1, compound 2, compound 3 and compound 5 in a solvent or solvent mixture designated as SM and in the presence of a catalyst designated as C1 and heating the reactant mixture to obtain a product comprising the chemical structure 2 shown below; and then (b) reacting the product with compound 6 in a solvent mixture designated as SM(a) and in the presence of a catalyst designated as C2 to produce the polymer. Some particular examples of the solvents SM and SM(a) and the catalysts C1 and C2 are described below.

ethyl formamide, N-methyl-2-pyrrolidone, sulfolane and mixtures thereof; the nonpolar solvent is selected from benzene, toluene, o-xylene, m-xylene, p-xylene and mixtures thereof; and the ratio of polar aprotic solvent to nonpolar solvent is within a range of from about 1:9 to about 9:1.

Also, the solvent mixture designated as SM(a) can be any suitable solvent or mixture. For example, in a particular embodiment SM(a) comprises a mixture containing polar aprotic solvent, nonpolar solvent and polar solvent; the polar aprotic solvent is selected from N,N' dimethyl acetamide, N,N'-dimethyl formamide, N-methyl-2-pyrrolidone, sulfolane and mixtures thereof; the nonpolar solvent is selected from benzene, toluene, o-xylene, m-xylene, p-xylene and mixtures thereof; the polar solvent is selected from n-butanol, isopropanol, cyclohexanol and mixtures thereof; and the ratio of polar aprotic solvent to nonpolar solvent to polar solvent is within a range of from about 1:7:2 to about 6:2.5:0.5.

The catalyst C1 can be any suitable catalyst or a mixture of different catalysts. In a particular embodiment, the catalyst C1 is selected from alkali metals and their carbonates, alkali earth metals and their hydroxides, alkali metal salts of transition metal phosphates and mixtures thereof, and the amount of catalyst C1 is within a range of from about 1 to about 30 mole percent excess to the combined mole ratio of compound 3 and compound 5.

Also, the catalyst C2 can be any suitable catalyst or a mixture of different catalysts. In a particular embodiment, the catalyst C2 is selected from sulfuric acid, phosphoric acid, polyphosphoric acid, p-toluene sulfonic acid, alkali metals and their carbonates, alkali earth metals and their hydroxides, alkali metal salts of transition metal phosphates and mixtures thereof, and wherein the amount of catalyst C2 is within a range of from about 1 to about 30 mole percent.

STRUCTURE 2

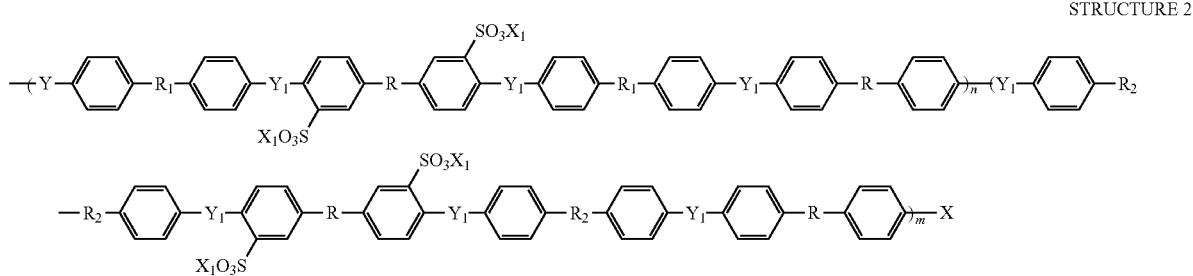

Where X = F, Cl, Br, I  Y = OH, SH
$X_1$ = Na, K, Cs, Rb  $Y_1$ = O, S

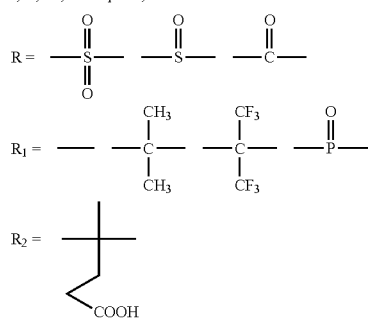

The solvent or solvent mixture designated as SM can be any suitable solvent or mixture. For example, in a particular embodiment SM comprises a solvent mixture containing polar aprotic solvent and nonpolar solvent; the polar aprotic solvent is selected from N,N' dimethyl acetamide, N,N'-dim- The polymer can also include one or more additives that increase ionic conductivity of the polymer. Any suitable additive having this effect or mixtures of different additives can be used. For example, in a particular embodiment the additive is selected from heteropolyacids, phosphates of transition metals, immobilized heteropolyacids on transition metal phosphates, or mixtures of these additives.

The polymer can be used in many different applications. In some embodiments, the polymer is used as a component or to make a component of an electrochemical device such as a fuel cell. Some nonlimiting examples include membrane electrode assemblies, membranes, electrodes, binder solutions, catalyst inks, and binders for making membrane electrode assemblies. The polymer is useful in the different types of fuel cells, including both hydrogen fueled and direct methanol fuel cells.

EXAMPLES

Example 1

Synthesis of 4,4'-(4-(1H-benzo[d]imidazol-2-yl)butane-2,2-diyl)diphenol

In a four neck 250 mL reaction kettle equipped with an overhead stirrer, thermocouple, gas inlets adapter and condenser, were charged 30.01 gram 4,4-bis(4-hydroxyphenyl) pentanoic acid (0.1048 moles), 15.17 gram 1,2-phenylenediamine (0.1403 moles) and 150 gram polyphosphoric acid. The mixture was stirred at 250 rpm at room temperature for 15 minutes and heated up to 120° C. under argon atmosphere. The reaction was continued for 3 hours and the product was cooled to room temperature. The product obtained in phosphoric acid solution was isolated by precipitating in water followed by neutralization and filtration. The isolated product was dried in vacuum at 90° C. for 48 hours. The conversion of acid to benzimidazole functionality was confirmed by IR spectroscopy.

Example 2

Synthesis of Sulfonated Poly(Aryl Ether Sulfone) Containing Benzimidazole Backbone In a 1 liter resin reaction kettle equipped with a stir rod, thermocouple, Dean Stark condenser and inlet for gas purging, were charged biphenyl-4,4'-diol (30 g, 0.1611 moles), 4,4'-(4-(1H-benzo[d]imidazol-2-yl)butane-2,2-diyl)diphenol (17.32 g, 0.0483 moles), 4,4'-sulfonylbis(chlorobenzene) (39.09 g, 0.1361 moles), sodium 5,5'-sulfonylbis(2-chlorobenzenesulfonate) (36.01 g, 0.0733 moles), $K_2CO_3$ (33.29 g, 0.2409 moles), 600 mL N,N'-dimethylacetamide and 300 mL toluene. The reagents were heated slowly until the reflux temperature reached about 133° C., and the reflux was maintained for 4 hours. Toluene was gradually removed and the temperature was increased to 165° C. The reaction was maintained for 20 hours at that temperature. At the end of 20 hours, the reaction mixture was cooled to 80° C. and the polymer solution was filtered using a Buckner funnel fitted with Whatman® filter paper No 4. The filtered polymer solution was isolated by precipitating in water followed by drying in a vacuum oven at 120° C. for 24 hours.

Example 3

Synthesis of Sulfonated Poly(Aryl Ether Sulfone) Containing Carboxylic Acid Backbone In a 1 liter resin reaction kettle equipped with a stir rod, thermocouple, Dean Stark condenser and inlet for gas purging, were charged biphenyl-4,4'-diol (38.80 g, 0.2084 moles), 4,4-bis(4-hydroxyphenyl)pentanoic acid (5.97 g, 0.0208 moles), 4,4'-sulfonylbis(chlorobenzene) (52.65 g, 0.1834 moles), sodium 5,5'-sulfonylbis(2-chlorobenzenesulfonate) (22.52 g, 0.0458 moles), $K_2CO_3$ (39.74 g, 0.2875 moles), 600 mL N,N'-dimethylacetamide and 300 mL toluene. The reagents were heated slowly until the reflux temperature reached about 133° C., and the reflux was maintained for 4 hours. Toluene was gradually removed and the temperature was increased to 165° C. The reaction was maintained for 20 hours at that temperature. At the end of 20 hours, the reaction mixture was cooled to 80 C and the polymer solution was filtered using a Buckner funnel fitted with Whatman® filter paper No 4. The filtered polymer solution was isolated by precipitating in water followed by drying in a vacuum oven at 120° C. for 24 hours.

The polymer had the following properties:
Ionic Conductivity
(a) at 80° C. 72% relative humidity=1.57E-02
(b) at 120° C. 30% relative humidity=1.0E-12
Volume change (%) in 30% Methanol at 60 deg C. for 48 hours=338

Example 4

Synthesis of Sulfonated Poly(Aryl Ether Sulfone) Containing Benzimidazole Backbone from Carboxylic Acid Containing Sulfonated Poly(Aryl Ether Sulfone)

In 2 liter beaker containing 1 liter of 2 M sulfuric acid, were charged 25.12 grams of the polymer obtained from Example 3. The content in the beaker was stirred on a stir plate using a magnetic stir bar and the beaker was heated to 70° C., and this temperature was maintained for 5 hours. The product obtained in the beaker was cooled to room temperature and filtered. The product was washed with 250 mL of distilled water 10 times or until the washing was neutral to litmus paper. The product was dried in a convection oven at 80° C. for 12 hours. The dried product (15.1 g) was charged along with 1.18 g 1,2-phenylenediamine, 125 mL N,N-dimethyl acetamide, 20 mL n-butanol, 5.2 gram o-phosphoric acid (85%), and 25 mL toluene in a four neck 250 mL reaction kettle equipped with an overhead stirrer, thermocouple, gas inlets adapter and condenser. The mixture was stirred at 250 rpm at room temperature for 15 minutes and heated to 150° C. under argon atmosphere to remove all the toluene. The reaction was continued for 6 hours and the product was cooled to room temperature. The product obtained was isolated by precipitating in water followed by neutralization and filtration. The isolated product was dried in vacuum at 90° C. for 48 hours. The conversion of acid to benzimidazole functionality was confirmed by IR spectroscopy.

The ionic conductivity at 50% RH and 120° C. of the benzimidazole containing polymer produced in Example 4 was $6.2 \times 10^{-5}$ S/cm. However, the ionic conductivity of the non-benzimidazole containing polymer produced in Example 3 was below the instrument detection level ($1 \times 10^{-12}$ S/cm).

Example 5

Synthesis of Benzimidazole Grafted Polymer

Step 1:
In a 250 ml reaction kettle were charged 7.01 g poly(4-vinyl phenol) Mn~10,000 obtained from Polysciences and 120 mL of tetrohydrofuran and stirred at room temperature under argon atmosphere. After complete dissolution of the solid particles, 1.8 grams of NaH (60% dispersion in paraffin oil, obtained from Aldrich) was added and stirred well. 12.2 grams of 6-bromohexanoic acid was dissolved in 20 mL of THF and this solution was added to the reaction kettle over a period of 30 min. The reaction was carried out for 12 hours at room temperature and the product was isolated carefully by precipitating the reactant mixture in isopropanol followed by drying the product in a vacuum oven for 12 hours at 40° C.

Step 2:

The dried product (5.57 g) obtained from step 1 was charged along with 3.1 grams 1,2-phenylenediamine, 120 mL N,N-dimethyl acetamide, 30 mL n-butanol, 10 grams o-phosphoric acid (85%), and 40 mL toluene in a four neck 250 mL reaction kettle equipped with an overhead stirrer, thermocouple, gas inlets adapter and condenser. The mixture was stirred at 250 rpm at room temperature for 15 minutes and heated to 150° C. under argon atmosphere to remove all the toluene. The reaction was continued for 6 hours and the product was cooled to room temperature.

Example 6

The product obtained from step 2 of Example 5 (10.03 g) was mixed with 3.93 grams of polymer obtained from Example 3 and stirred at room temperature for 12 hours and poured onto a Teflon mold followed by heating at 80° C. for 12 hours to obtain a film. The film was soaked in 150 mL of 0.5 M H2SO4 at 70° C. for 2 hours and then washed with distilled water till the washing is neutral to pH paper. The film was dried in a vacuum oven for 12 hours.

The polymer film had the following properties:

Ionic Conductivity (a) at 80° C. 72% relative humidity=1.48E-02

(b) at 120° C. 30% relative humidity=2.10E-04

Example 7

The product obtained from step 2 of Example 5 (10.03 g) was mixed with 1.31 grams of polymer obtained from Example 3 and stirred at room temperature for 12 hours and poured onto a Teflon mold followed by heating at 80° C. for 12 hours to obtain a film. The film was soaked in 150 mL of 0.5 M H2SO4 at 70° C. for 2 hours and then washed with distilled water until the washing was neutral to pH paper. The film was dried in a vacuum oven for 12 hours.

The polymer film had the following properties:

Ionic Conductivity (a) at 80° C. 72% relative humidity=1.18E-03

(b) at 120° C. 30% relative humidity=3.54E-06

Volume change (%) in 30% Methanol at 60 deg C. for 48 hours=150

Example 8

The product obtained from step 2 of Example 5 (10.03 g) was mixed with 0.44 grams of polymer obtained from Example 3 and stirred at room temperature for 12 hours and poured onto a Teflon mold followed by heating at 80° C. for 12 hours to obtain a film. The film was soaked in 150 mL of 0.5 M H2SO4 at 70° C. for 2 hours and then washed with distilled water until the washing was neutral to pH paper. The film was dried in a vacuum oven for 12 hours.

The polymer film had an ionic conductivity at 80° C. and 72% relative humidity of 1.53E-05.

In accordance with the provisions of the patent statutes, the polymers have been described in terms of their preferred embodiments. However, it must be understood that the polymers may be produced and used otherwise than as specifically described.

What is claimed is:

1. An ionically conductive polymer comprising the following chemical structure 1:

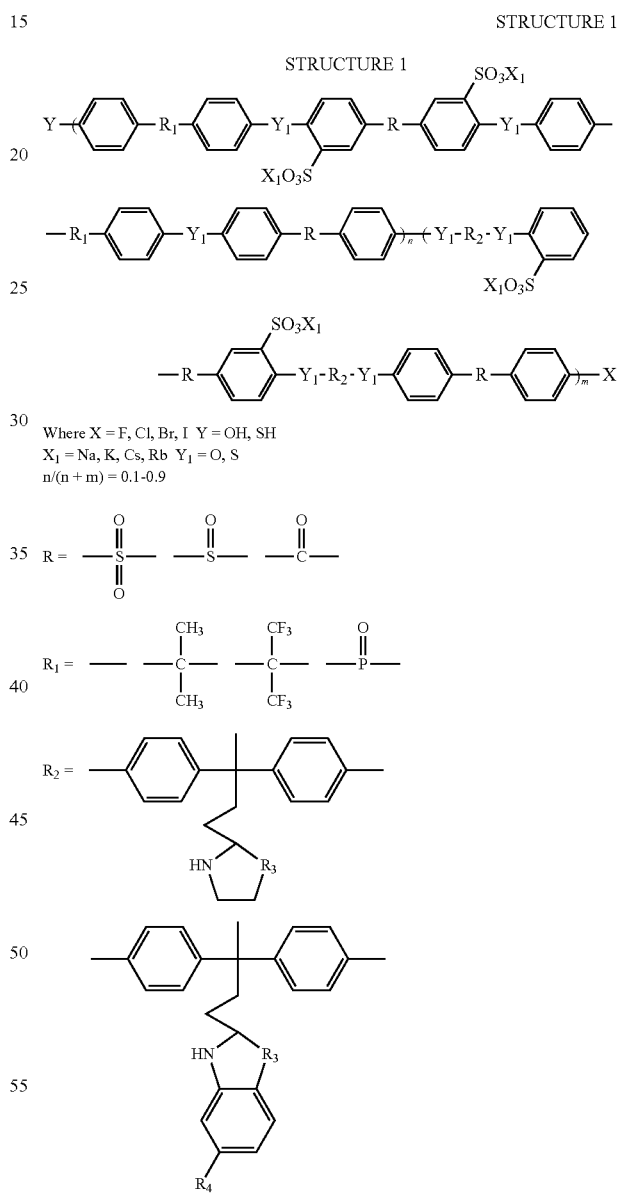

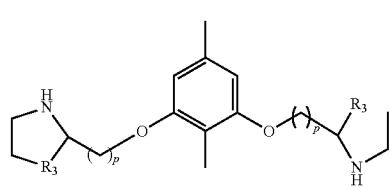

-continued

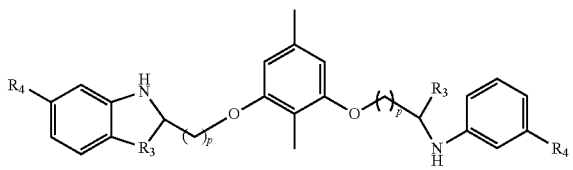

R$_3$ = N, O, S
R$_4$ = H, CF$_3$, CN
p = 1-12.

2. The polymer of claim 1 wherein the polymer has an ionic conductivity of at least about 1×10$^{-5}$ S/cm at a temperature of 120° C. when the polymer is substantially anhydrous.

3. The polymer of claim 1 wherein the polymer is derived from compound 1 comprising the following chemical structure, and wherein the amount of compound 1 is within a range of from about 10 to about 90 mole percent:

COMPOUND 1

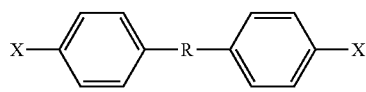

Where X = F, Cl, Br, I

R = —S(=O)(=O)— —S(=O)— —C(=O)—.

4. The polymer of claim 1 wherein the polymer is derived from compound 2 comprising the following chemical structure, and wherein the amount of compound 2 is within a range of from about 10 to about 90 mole percent:

COMPOUND 2

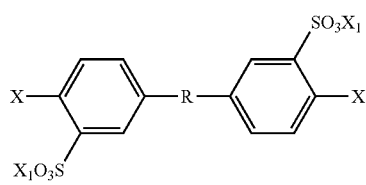

Where X = F, Cl, Br, I
X$_1'$ = Na, K, Cs, Rb

R = —S(=O)(=O)— —S(=O)— —C(=O)—.

5. The polymer of claim 1 wherein the polymer is derived from compound 3 comprising the following chemical structure, and wherein the amount of compound 3 is within a range of from about 10 to about 90 mole percent:

COMPOUND 3

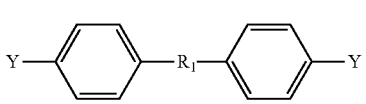

Where Y = OH, SH

R = —C(CH$_3$)(CH$_3$)— —C(CF$_3$)(CF$_3$)— —P(=O)—.

6. The polymer of claim 1 wherein the polymer is derived from compound 4 comprising the following chemical structure, and wherein the amount of compound 4 is within a range of from about 10 to about 90 mole percent:

COMPOUND 4

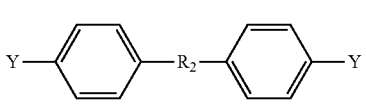

Where Y = OH, SH

R$_2$ =

R$_3$ = N, O, S
R$_3$ = N, O, S
R$_4$ = H, CF$_3$, CN.

7. The polymer of claim 1 wherein the polymer is derived from compound 1, compound 2, compound 3 and compound 4.

8. The polymer of claim 1 further comprising an additive that increases ionic conductivity of the polymer.

9. The polymer of claim 8 wherein the additive is selected from heteropolyacids, phosphates of transition metals, immobilized heteropolyacids on transition metal phosphates and mixtures thereof.

10. A membrane electrode assembly comprising a polymer electrolyte membrane made from a first polymer, the membrane sandwiched between a pair of electrodes including a second polymer as a binder, where at least one of the first and second polymers comprises an ionically conductive polymer comprising the following chemical structure 1:

STRUCTURE 1
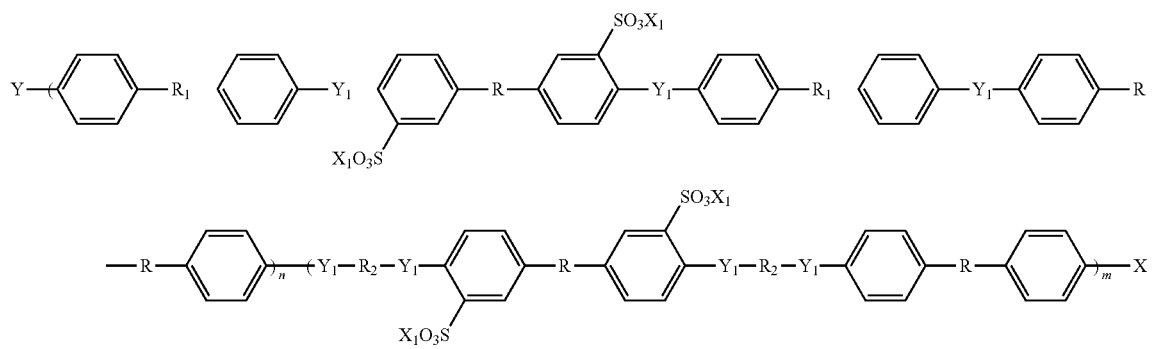
Where X = F, Cl, Br, I  Y = OH, SH
$X_1$ = Na, K, Cs, Rb  $Y_1$ = O, S
n/(n + m) = 0.1-0.9
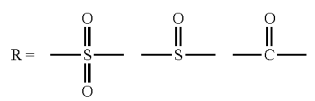
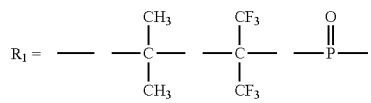
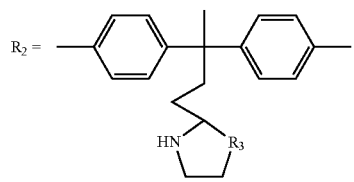
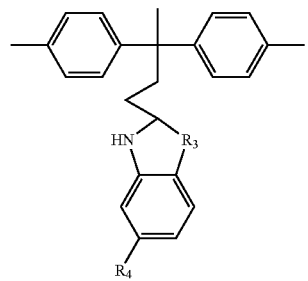
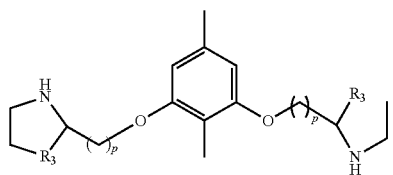
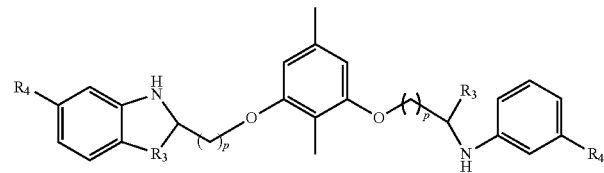
$R_3$ = N, O, S
$R_4$ = H, $CF_3$, CN
p = 1-12.
11. The membrane electrode assembly of claim 10 which is operable at a temperature above 150° C.
12. A fuel cell component made from an ionically conductive polymer comprising the following chemical structure 1:

STRUCTURE 1
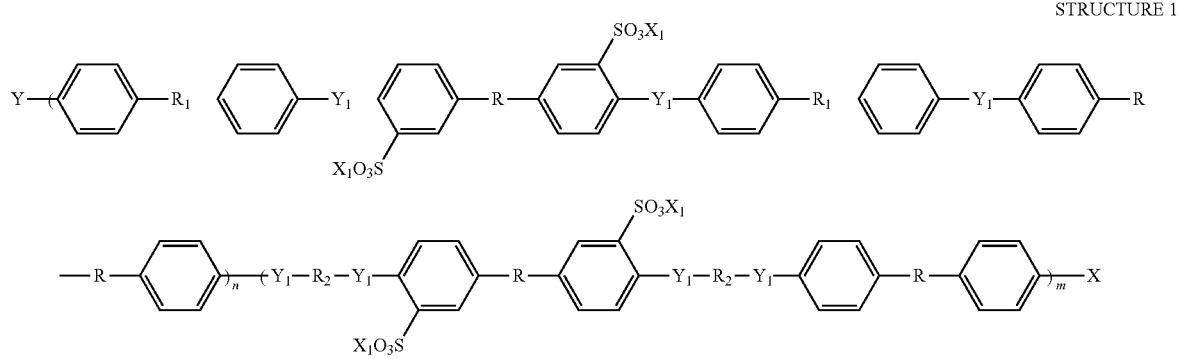
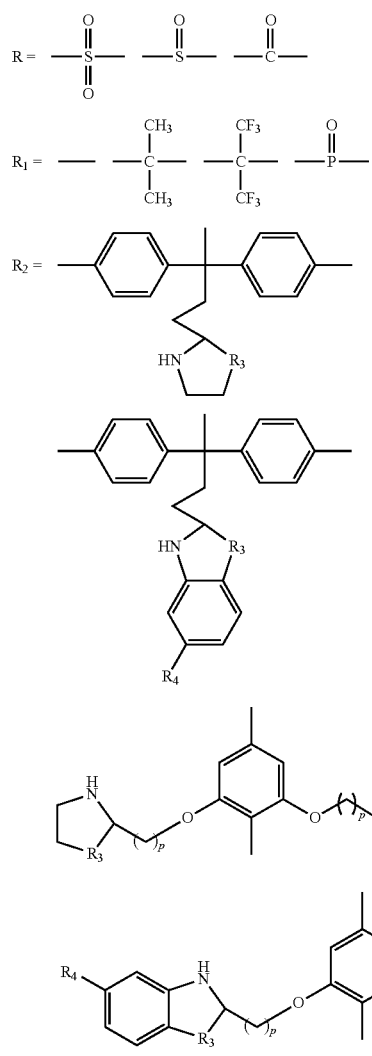
Where X = F, Cl, Br, I  Y = OH, SH
$X_1$ = Na, K, Cs, Rb  $Y_1$ = O, S
n/(n + m) = 0.1-0.9
$R_3$ = N, O, S
$R_4$ = H, $CF_3$, CN
p = 1-12.
13. The fuel cell component of claim 12 which comprises a polymer electrolyte membrane or an electrode binder.
14. A process of producing an ionically conductive polymer comprising the following chemical structure 1, the process comprising mixing reactants in a solvent or a solvent mixture and heating the reactant mixture to produce the polymer:
STRUCTURE 1
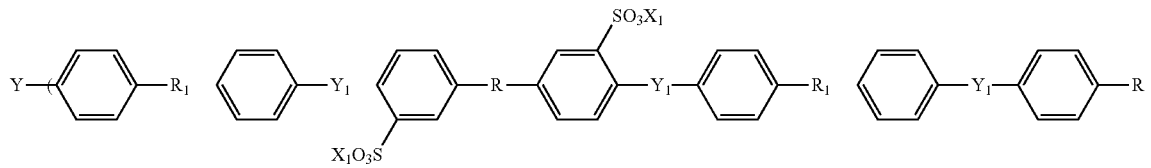
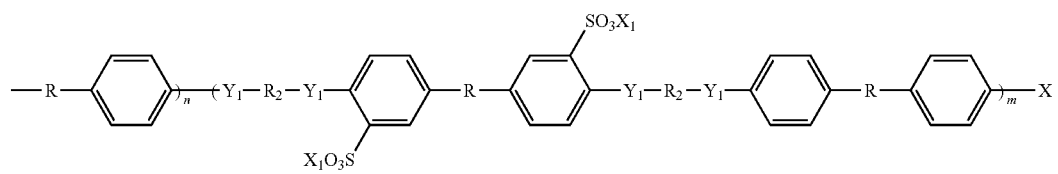
Where X = F, Cl, Br, I  Y = OH, SH
$X_1$ = Na, K, Cs, Rb  $Y_1$ = O, S
$n/(n + m) = 0.1-0.9$
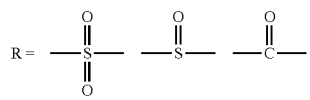
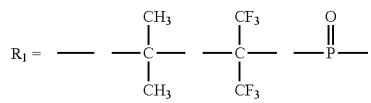
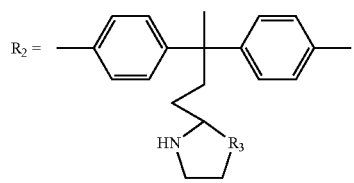
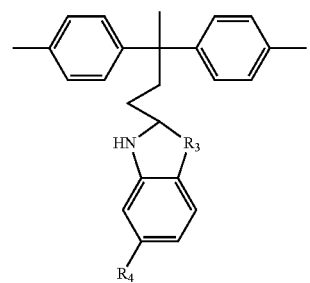
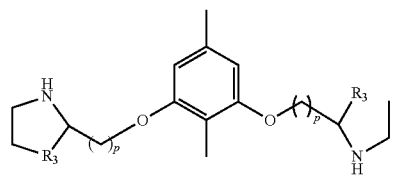

-continued

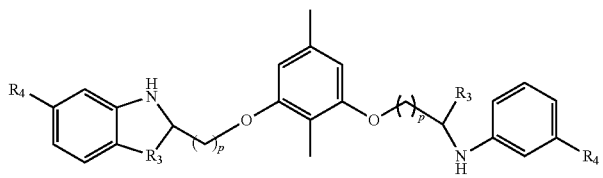

$R_3$ = N, O, S
$R_4$ = H, $CF_3$, CN
p = 1-12.

15. The process of claim 14 wherein the polymer is produced by mixing the reactants in a solvent mixture comprising polar aprotic solvent and nonpolar solvent.

16. The polymer of claim 15 wherein the polar aprotic solvent is selected from N,N' dimethyl acetamide, N,N'-dimethyl formamide, N-methyl-2-pyrrolidone, sulfolane and mixtures thereof.

17. The polymer of claim 15 wherein the nonpolar solvent is selected from benzene, toluene, o-xylene, m-xylene, p-xylene and mixtures thereof.

18. The polymer of claim 15 wherein the solvent mixture comprises the polar aprotic solvent and the nonpolar solvent in a weight ratio within a range of from about 1:9 to about 9:1.

19. The polymer of claim 15 wherein the weight ratio of the polar aprotic solvent to the nonpolar solvent is within a range of from about 6:4 to about 8:2.

20. A process of producing an ionically conductive polymer comprising the following chemical structure 1, the process comprising a catalyzed reaction:

STRUCTURE 1

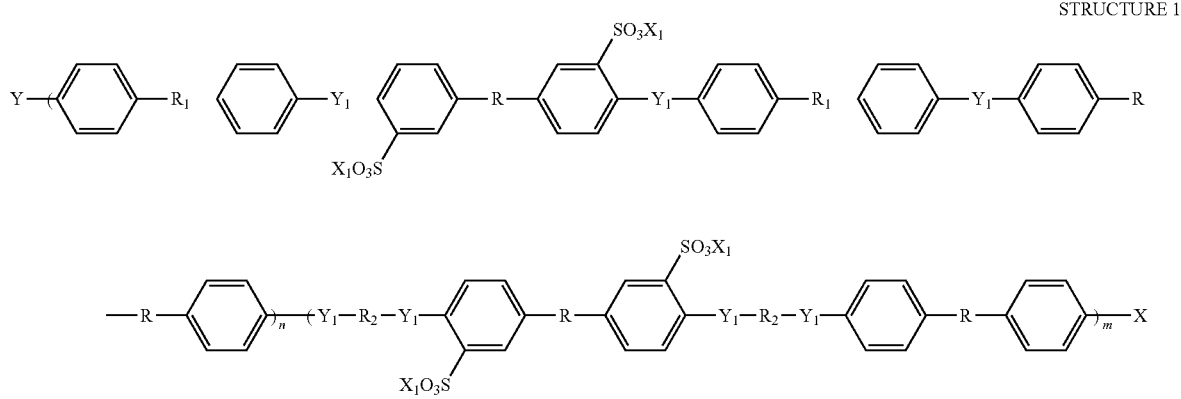

Where X = F, Cl, Br, I  Y = OH, SH
$X_1$ = Na, K, Cs, Rb  $Y_1$ = O, S
n/(n + m) = 0.1-0.9

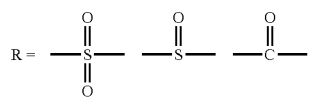

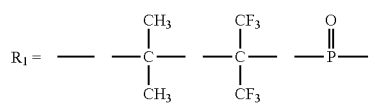

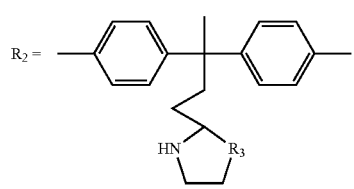

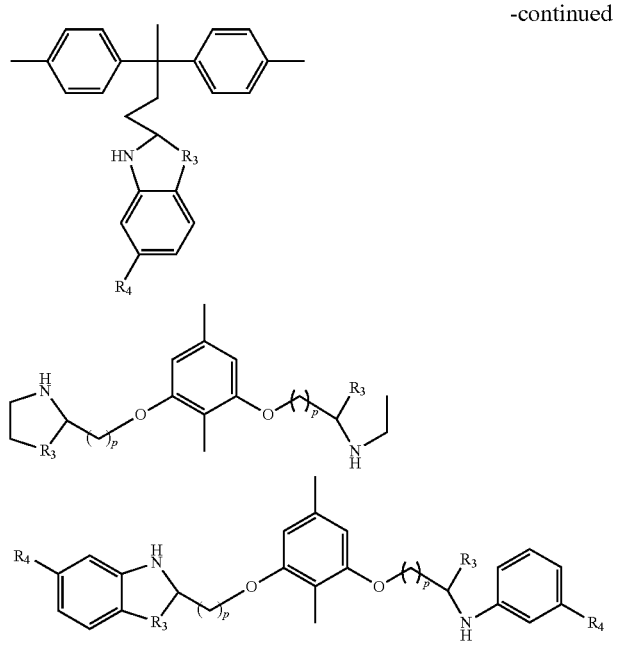

R₃ = N, O, S
R₄ = H, CF₃, CN
p = 1-12.

21. The process of claim 20 wherein the catalyst is selected from alkali metals and their carbonates, alkali earth metals and their hydroxides, alkali metal salts of transition metal phosphates and mixtures thereof.

22. The process of claim 20 wherein the polymer is derived from compound 1, compound 2, compound 3 and compound 4, and wherein the amount of catalyst is within a range of from about 1 to about 30 mole percent excess to the combined mole ratio of compound 3 and compound 4.

23. A process of producing an ionically conductive polymer comprising the following chemical structure 1,

STRUCTURE 1

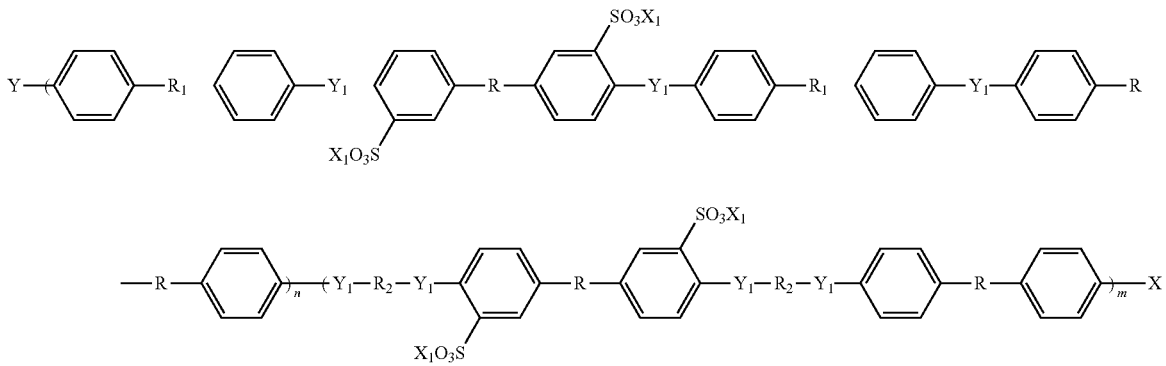

Where X = F, Cl, Br, I  Y = OH, SH
X₁ = Na, K, Cs, Rb  Y₁ = O, S
n/(n + m) = 0.1-0.9

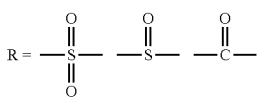

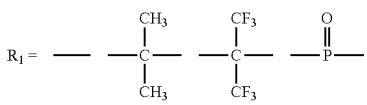

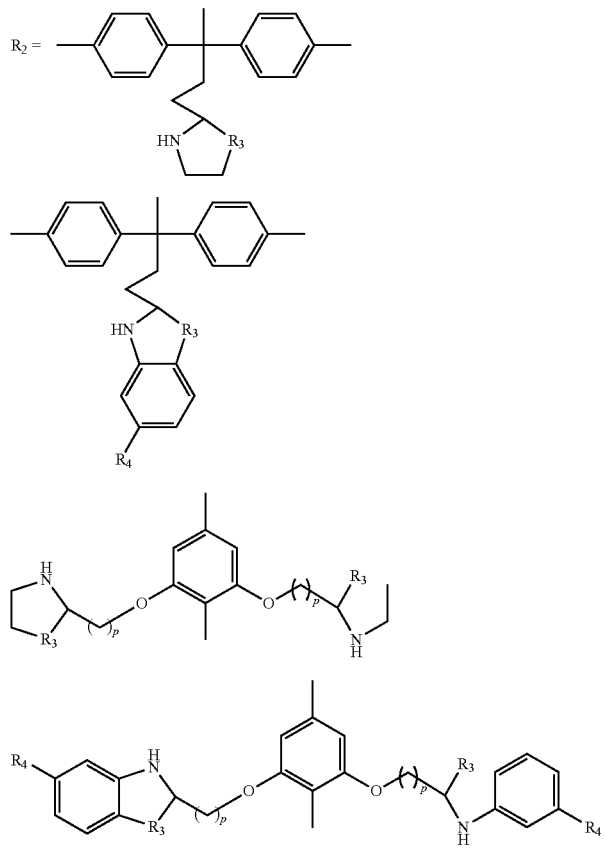

$R_3 = N, O, S$
$R_4 = H, CF_3, CN$
$p = 1-12.$ the process including deriving the polymer from compound 4 comprising the following chemical structure, where the amount of compound 4 is within a range of from about 10 to about 90 mole percent,

COMPOUND 4

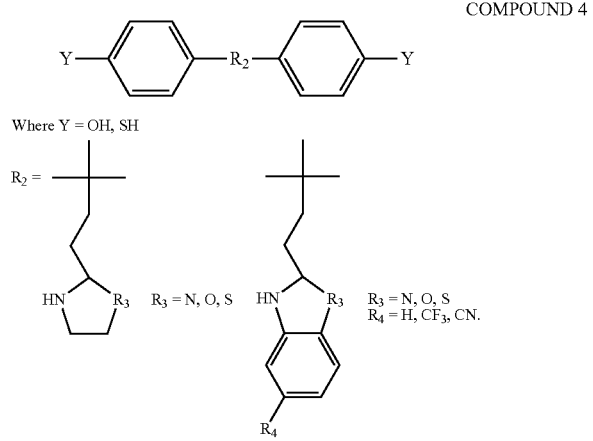

the compound 4 produced by reacting compound 5 with compound 6 comprising the following chemical structures:

COMPOUND 5

Where Y = OH, SH $R_2 =$

COMPOUND 6

Where R5 = NH2, OH, SH
R5' = H, CF3, CN.

24. The process of claim 23 wherein the compound 5 and the compound 6 are reacted in a solvent mixture comprising a polar aprotic solvent, a nonpolar solvent, and a polar solvent.

25. The polymer of claim 24 wherein the weight ratio of polar aprotic solvent to nonpolar solvent to polar solvent is within a range of from about 1:7:2 to about 6:2.5:0.5.

26. The polymer of claim 25 wherein the weight ratio of polar aprotic solvent to nonpolar solvent to polar solvent is within a range of from about 6:3:1 to about 7:2.5:0.5.

27. The polymer of claim 24 wherein the polar aprotic solvent is selected from N,N' dimethyl acetamide, N,N'-dimethyl formamide, N-methyl-2-pyrrolidone, sulfolane and mixtures thereof; the nonpolar solvent is selected from benzene, toluene, o-xylene, m-xylene, p-xylene and mixtures thereof; and the polar solvent is selected from n-butanol, isopropanol, cyclohexanol and mixtures thereof.

28. The process of claim 23 wherein the reaction of compound 5 with compound 6 uses a catalyst selected from sulfuric acid, phosphoric acid, polyphosphoric acid, p-toluene sulfonic acid, alkali metals and their carbonates, alkali earth metals and their hydroxides, alkali metal salts of transition metal phosphates and mixtures thereof, and wherein the amount of catalyst is within a range of from about 1 to about 30 mole percent.

29. A process of producing an ionically conductive polymer comprising the following chemical structure 1:

STRUCTURE 1

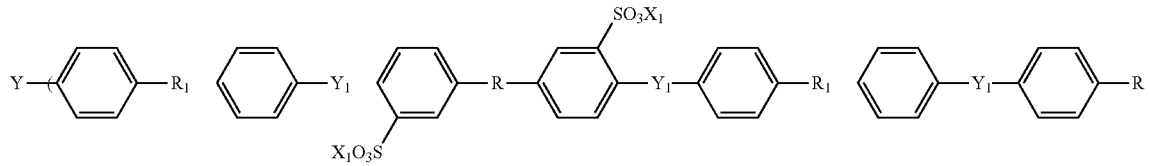

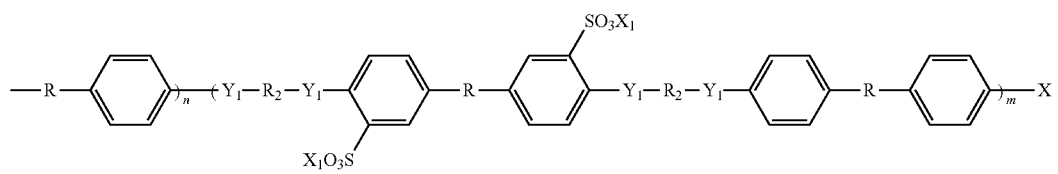

Where X = F, Cl, Br, I  Y = OH, SH
$X_1$ = Na, K, Cs, Rb  $Y_1$ = O, S
n/(n + m) = 0.1-0.9

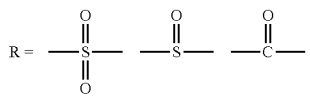

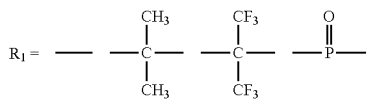

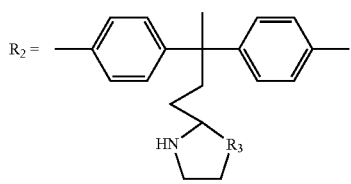

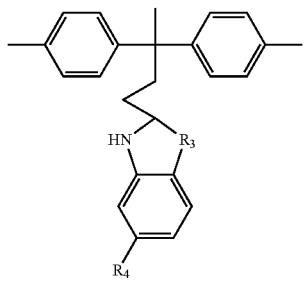

-continued

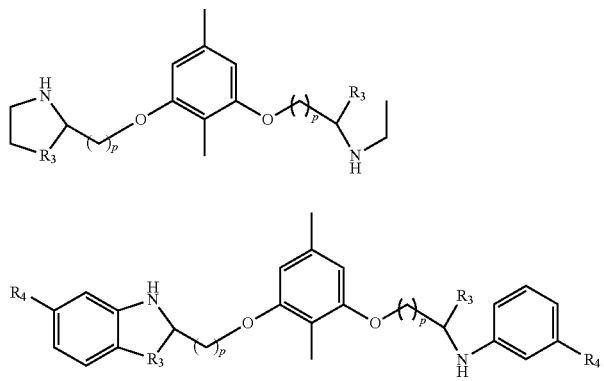

$R_3$ = N, O, S
$R_4$ = H, $CF_3$, CN
p = 1-12.

the process comprising producing the polymer by the steps of:
(a) mixing compound 1, compound 2, compound 3 and compound 5 in a solvent or solvent mixture designated as SM and in the presence of a catalyst designated as C1 and heating the reactant mixture to obtain a product comprising the following chemical structure 2; and then
(b) reacting the product with compound 6 in a solvent mixture designated as SM(a) and in the presence of a catalyst designated as C2 to produce the polymer:

is selected from benzene, toluene, o-xylene, m-xylene, p-xylene and mixtures thereof; and the ratio of polar aprotic solvent to nonpolar solvent is within a range of from about 1:9 to about 9:1.

31. The process of claim 29 wherein the solvent mixture SM(a) comprises a mixture containing polar aprotic solvent, nonpolar solvent and polar solvent; the polar aprotic solvent is selected from N,N' dimethyl acetamide, N,N'-dimethyl formamide, N-methyl-2-pyrrolidone, sulfolane and mixtures thereof; the nonpolar solvent is selected from benzene, tolu-

STRUCTURE 2

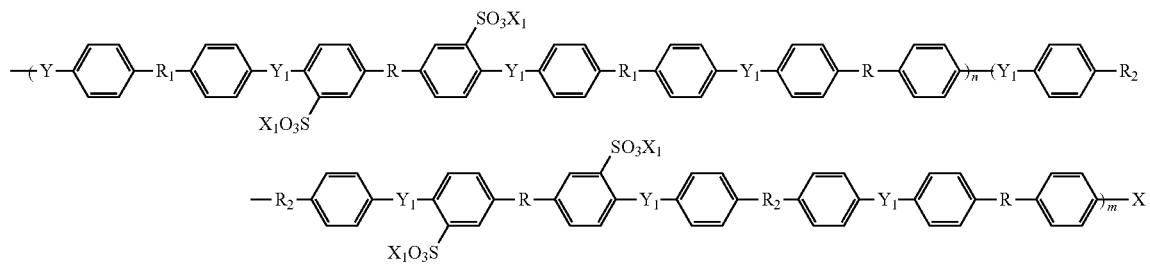

Where X = F, Cl, Br, I  Y = OH, SH
$X_1$ = Na, K, Cs, Rb  $Y_1$ = O, S

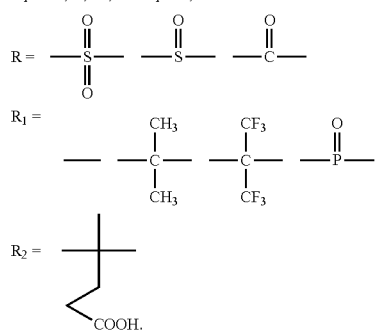

30. The process of claim 29 wherein SM comprises a solvent mixture containing polar aprotic solvent and nonpolar solvent; the polar aprotic solvent is selected from N,N' dimethyl acetamide, N,N'-dimethyl formamide, N-methyl-2-pyrrolidone, sulfolane and mixtures thereof; the nonpolar solvent ene, o-xylene, m-xylene, p-xylene and mixtures thereof; the polar solvent is selected from n-butanol, isopropanol, cyclohexanol and mixtures thereof, and the ratio of polar aprotic solvent to nonpolar solvent to polar solvent is within a range of from about 1:7:2 to about 6:2.5:0.5.

32. The process of claim 29 wherein the catalyst C1 is selected from alkali metals and their carbonates, alkali earth metals and their hydroxides, alkali metal salts of transition metal phosphates and mixtures thereof, and the amount of catalyst C1 is within a range of from about 1 to about 30 mole percent excess to the combined mole ratio of compound 3 and compound 5.

33. The process of claim 29 wherein the catalyst C2 is selected from sulfuric acid, phosphoric acid, polyphosphoric acid, p-toluene sulfonic acid, alkali metals and their carbonates, alkali earth metals and their hydroxides, alkali metal salts of transition metal phosphates and mixtures thereof, and wherein the amount of catalyst C2 is within a range of from about 1 to about 30 mole percent.

* * * * *

UNITED STATES PATENT AND TRADEMARK OFFICE
CERTIFICATE OF CORRECTION

PATENT NO. : 8,362,195 B2  
APPLICATION NO. : 11/977804  
DATED : January 29, 2013  
INVENTOR(S) : Ramanathan S. Lalgudi et al.

Page 1 of 1

It is certified that error appears in the above-identified patent and that said Letters Patent is hereby corrected as shown below:

Title Page, Item (73)

Insert Assignee: -- Battelle Memorial Institute, Columbus, Ohio --

Signed and Sealed this
Twenty-third Day of April, 2013

Teresa Stanek Rea
*Acting Director of the United States Patent and Trademark Office*